United States Patent [19]
Popowski et al.

[11] Patent Number: 4,709,230
[45] Date of Patent: Nov. 24, 1987

[54] COLOR CONVERTER

[75] Inventors: James J. Popowski, Chicago; Richard Goldstein, Northbrook, both of Ill.

[73] Assignee: Questron, Inc., Northbrook, Ill.

[21] Appl. No.: 725,009

[22] Filed: Apr. 19, 1985

[51] Int. Cl.$^4$ ............................................. G09G 1/28
[52] U.S. Cl. ................................. 340/703; 340/701; 340/723; 358/81; 358/82
[58] Field of Search ............ 340/701, 703, 723, 815.1; 358/81, 82

[56] References Cited

U.S. PATENT DOCUMENTS

| | | | |
|---|---|---|---|
| 2,874,212 | 2/1959 | Bechley | 358/82 |
| 3,710,011 | 1/1973 | Altemus et al. | 358/82 |
| 4,232,311 | 11/1980 | Agneta | 340/703 |
| 4,329,710 | 5/1982 | Taylor | 358/81 |
| 4,484,187 | 11/1984 | Brown et al. | 340/703 |

FOREIGN PATENT DOCUMENTS

| | | | |
|---|---|---|---|
| 2032740 | 5/1980 | United Kingdom | 340/703 |
| 2116407 | 9/1983 | United Kingdom | 340/701 |

Primary Examiner—Gerald L. Brigance
Attorney, Agent, or Firm—Russell E. Hattis; Stephen R. Arnold

[57] ABSTRACT

A color converter circuit particularly suited for use with computer-steered multi-color display units accepts at its input terminals a plurality of color commands from the associated computer or other signal source, and includes manual selection means for selecting a corresponding plurality of different output color commands to be actuated selectively upon response of each different input color command to provide manual control of the colors of the generated pattern, without requiring software modification. Associated indicator lights adjacent each of the color-selecting switches indicate which colors in the form of color commands are being sent from the computer. A simplified version of the converter accepts monochrome commands capable of giving only dark and bright commands from the computer, and selectively provides optionally chosen different color commands to the display unit to correspond to each of the two input signal conditions.

27 Claims, 12 Drawing Figures

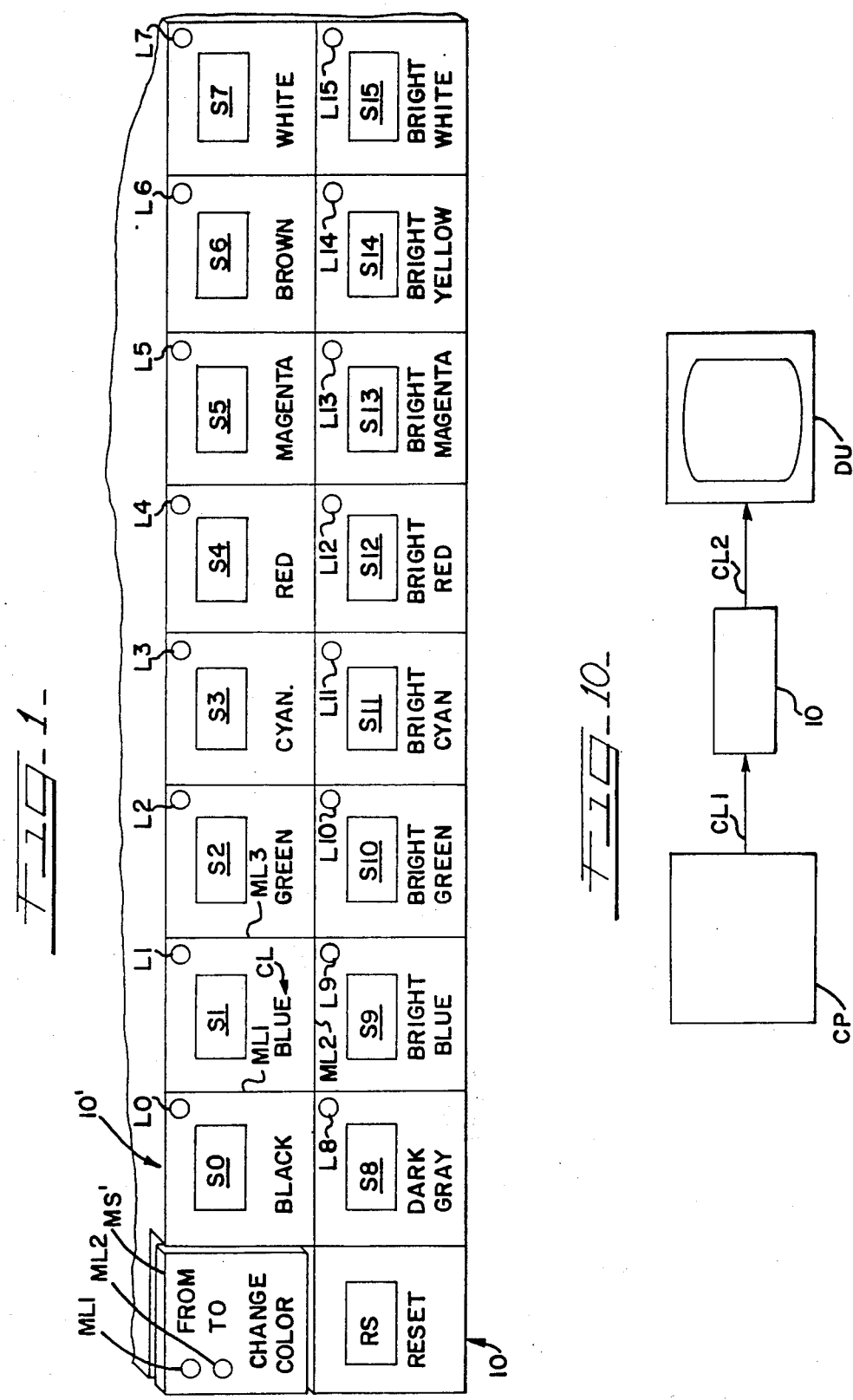

| FIG. 2A | FIG. 2B |

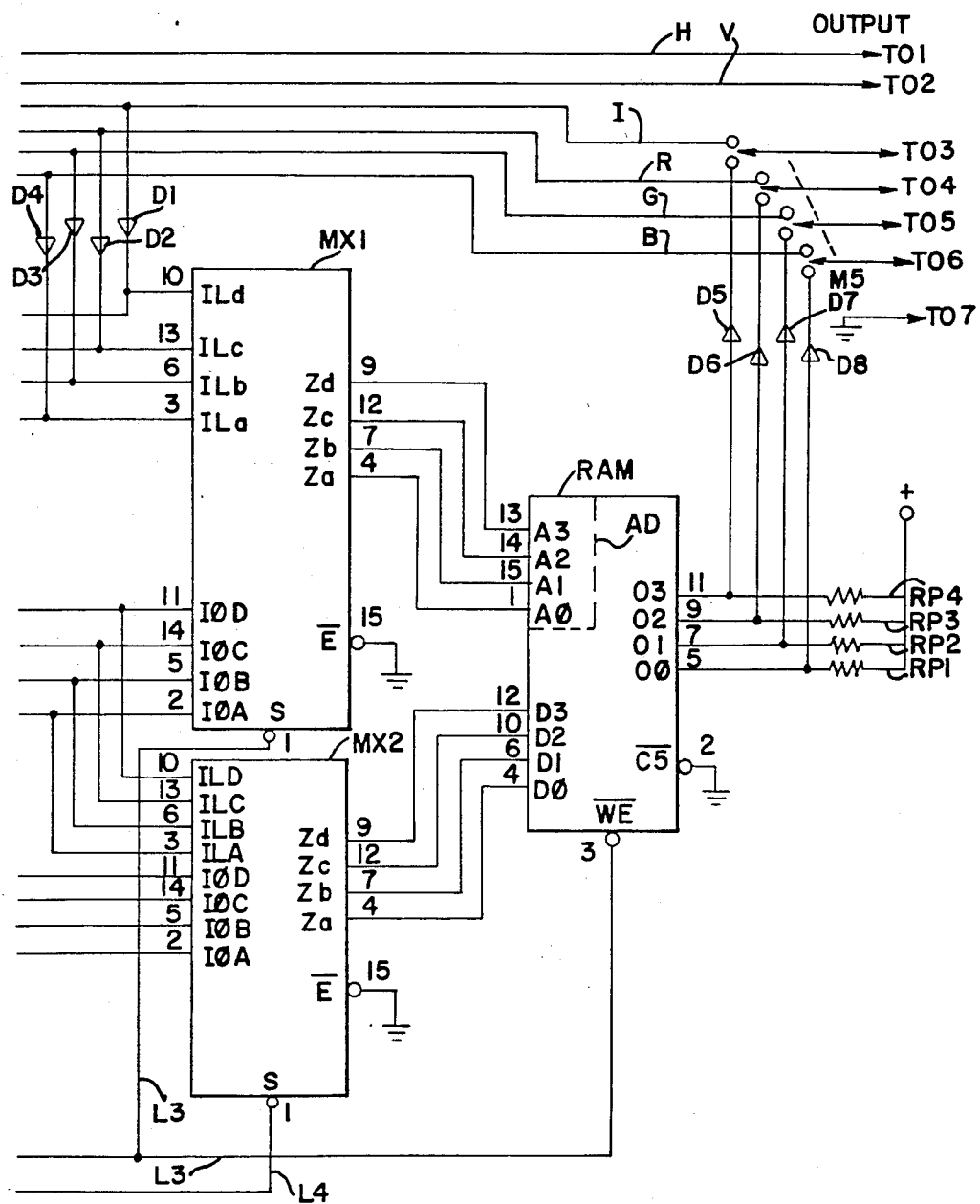

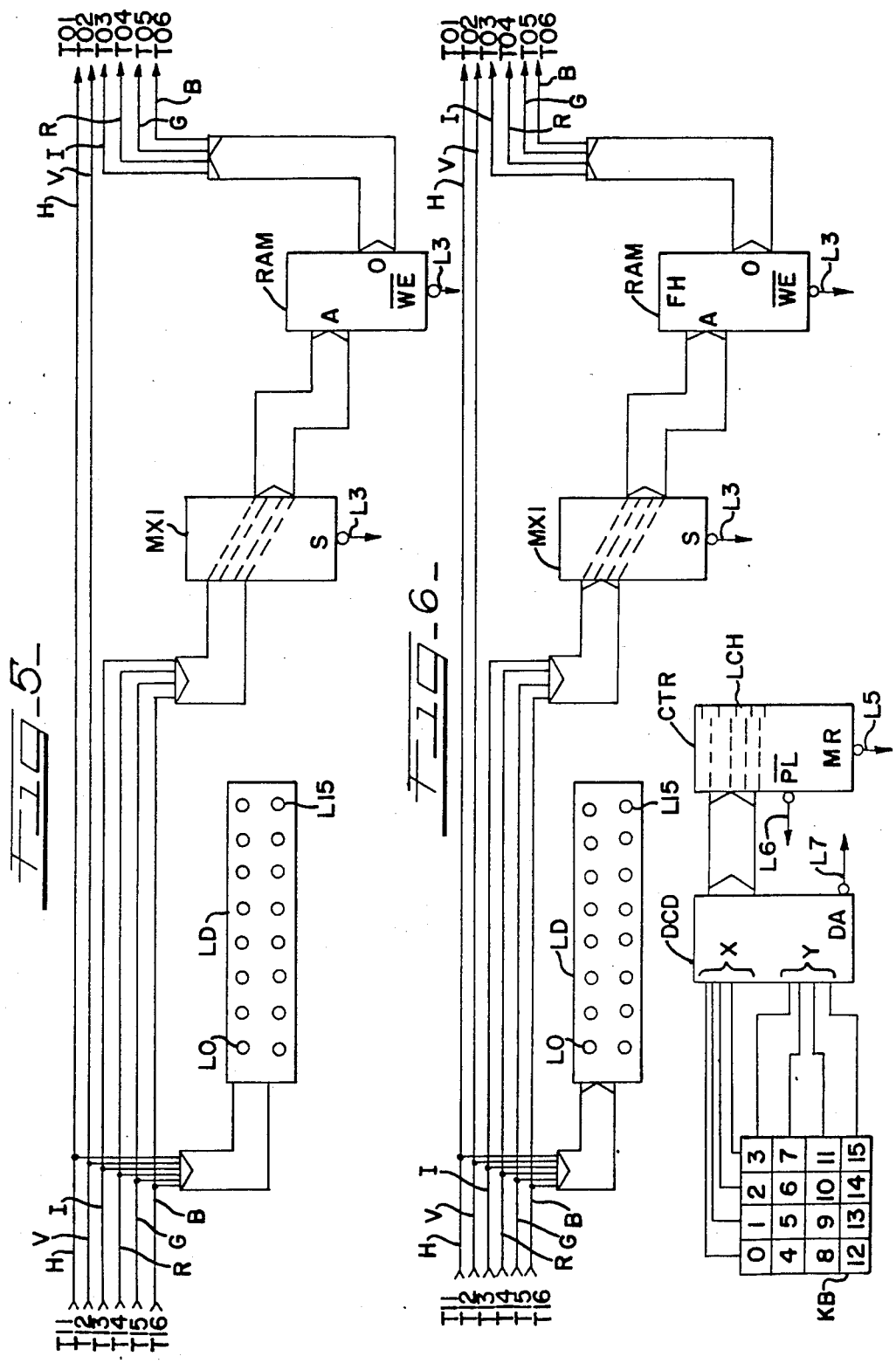

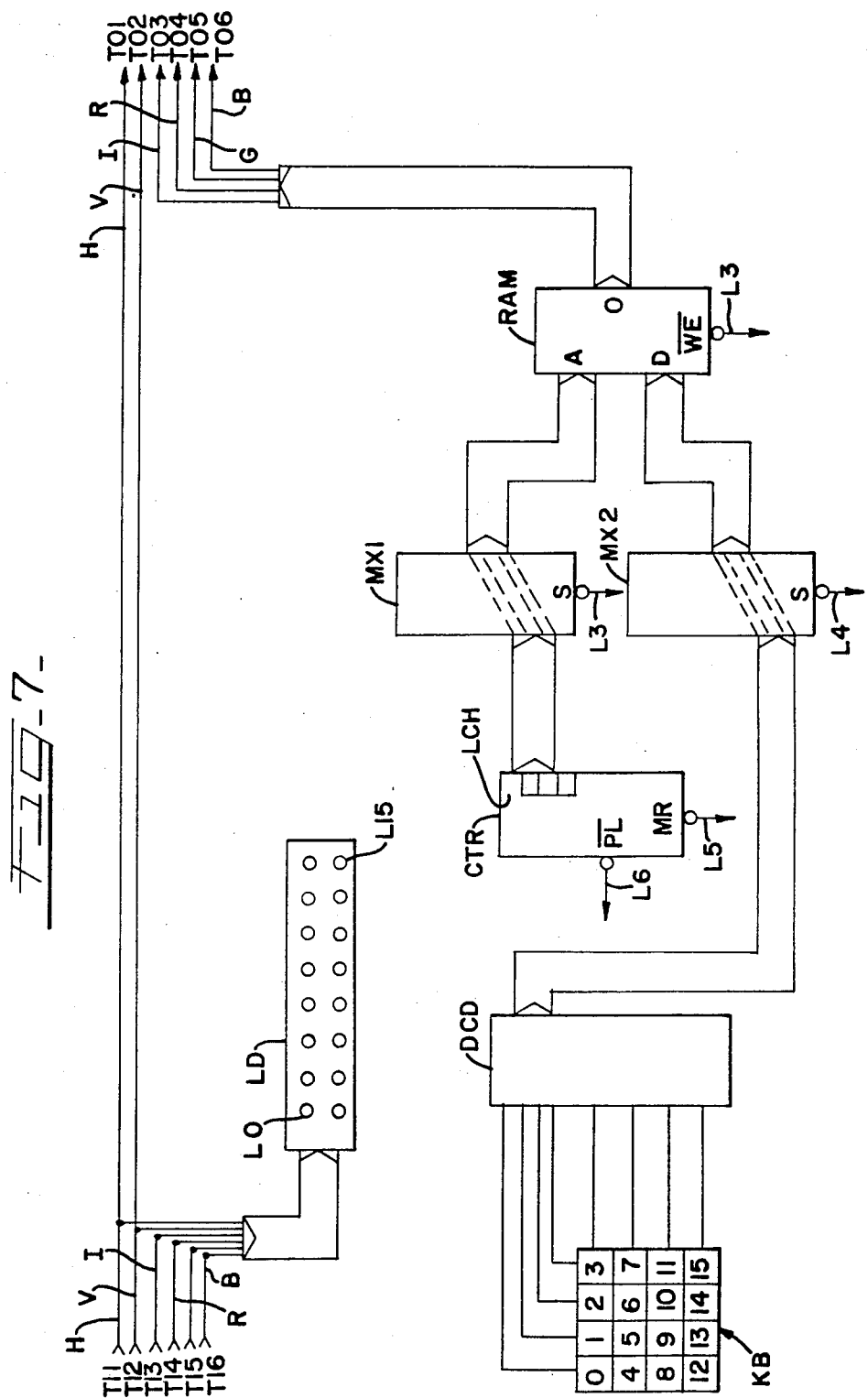

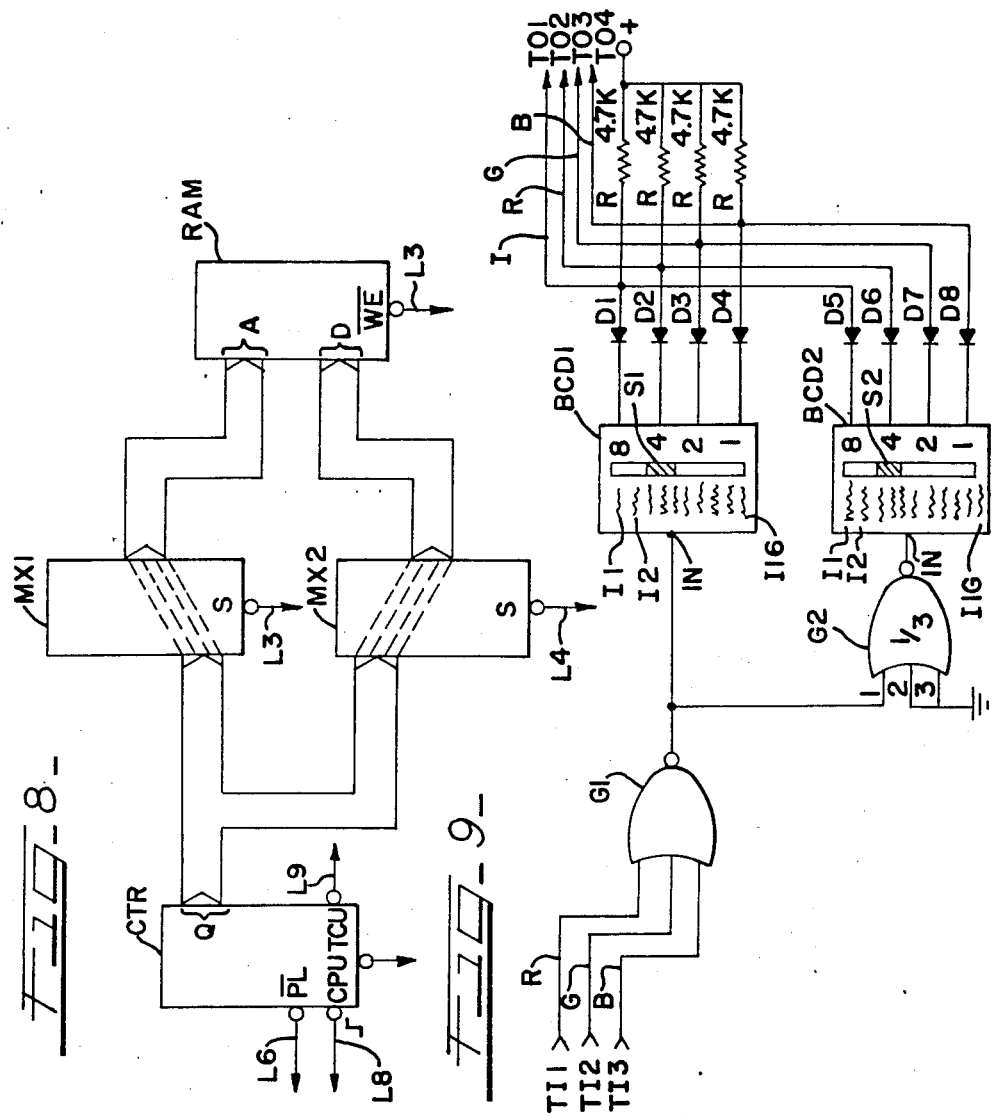

COLOR CONVERTER

DESCRIPTION

1. Technical Field of the Invention

The technical field of the invention is color display systems. While some aspects of the invention have a broader application, it has its most important application to computer controlled color display systems.

2. Background Prior Art

Personal computer usage has experienced massive growth in the past several years. The use of computers by professionals in business, science, medicine, engineering and even art has induced the world's largest computer producers to market such products. When the computer is used primarily for the processing of text or numerical information a monochrome monitor is usually adequate and is often preferred because of its generally superior definition and hence greater readability. Often a single color such as green or amber on a black background is used to minimize eye fatigue with long periods of use. As used throughout this application, the terms "monitor", "display unit", or "display device" will be used to refer to any hardware device dedicated specifically to producing a displayed image or facsimile responsive preferably to binary control signals received from computer outputs.

Display units having multi-colored capability are now quite commonly used in conjunction with a digital computer which supplies commands to the display unit to cause the generation of multi-colored patterns. Most typically, such units are multi-color cathode ray tubes; however, multi-color paper pattern plotters are also used for purposes of generating a permanent record. Such display units respond to color commands, usually supplied in the form of binary signal levels on parallel connecting lines between the computer and display unit, the instantaneous state of these parallel lines (high or low) causing the display trace at any given instance to assume a given commanded color. The actual "steering" of the trace i.e. governing the points where a given trace begins and ends is achieved by means which are beyond the scope of this disclosure, but which are well known to ordinary skill in the art.

With particular reference to one common type of display presentation system, namely a pattern which is scanningly produced as in a television receiver, a computer-generated pattern is produced by communicating from the computer to the display unit along separately dedicated lines horizontal and vertical synchronizing pulses which actuate responsive circuitry in the color display unit to scan the beam across the display screen from one side to the other in a series of incrementally descending sweeps. Thus, for example, a computer-generated program for producing a pattern in the form of a vertical bar graph of red bars on a blue background would initiate pattern generation, concomitantly with generation of initial vertical and horizontal synchronization pulses, by outputting a continuous blue color command to the display unit. This particular condition of the parallel lines would be maintained in such a blue-indicating code until the sweep descends to the point where the top of the highest red bar is to be generated. When the beam spot reaches this point, the computer output command immediately changes from blue to red, maintaining a red-indicating color command code on the parallel lines until the beam on the cathode ray tube reaches the opposite edge of the bar, at which time the color command code produced by the computer will revert to the background blue-indicating command code, maintaining this condition until the next portion of a red bar is to be generated. The salient point to be recognized in such systems is that at any instant of time, only one of a finite number of unique color commands is communicated from the computer to the display unit. This is true of other forms of display presentation such as "vector" mode, which will not be further discussed.

The ability of the modern personal computer to create graphic symbols, figures and drawings has popularized the use of such color displays, which greatly enhance graphic presentations. Numerous applications of color graphics exist, from an endless variety of business and scientific charts and graphs to animated games, computer generated designs and new art forms. Computer aided designs of electronic circuits, architecture and machines often make use of color to clarify the details of intricate presentations. Even pure text programs such as word processors can make good use of color to display special commands for print attributes such as bold or italic type styles or underlined words.

In the past, a computer user who desired to have the benefits of a color display was often forced to compromise the quality of the text display because most color monitors had poorer definition than a good monochrome monitor. If his interest or need for the use of color was basically secondary to his principal use of the computer for text processing, he often elected either to forego having color or to use two monitors.

As the technology of color cathode ray tube (CRT) displays advanced, the resolution or definition of the color monitor improved, and the quality of a text display on the color monitor became quite satisfactory. Many users thereupon elected to have only a color monitor. However, this often resulted in a new problem; programs written for monochrome monitors were displayed in white (or gray) on a black background. Whereas text programs written with color features were often quite pleasing on a high resolution color monitor, monochrome programs were less pleasing than if displayed on a good green or amber monochrome monitor. Furthermore, the user might find that the colors chosen in a software program by the program author did not suit his taste, and that he wished for some way to alter them. It is beyond the skill of most computer users to alter the software to produce or change color, and some "copy protected" software cannot be altered and preserved in non-volatile form such as disk or tape storage.

There were other sources of disappointment among users of high resolution color monitors. The leading personal computer, and many compatible competitive models, have become dominant in the marketplace, yet cannot display color in their so-called "high resolution" graphics mode. Again, the capabilities of the high-resolution color monitor are wasted, since the user is forced to view high-resolution graphics in a tiresome, harsh black-and-white display.

Another limitation of the leading personal computers is evident in the so-called "medium-resolution" graphics mode which is used for color-graphics programs. There are eight different color command signals including black and white color command signals available in these computers, with two intensity or brightness levels for each. This gives an effect of having sixteen different "colors". While the background can be any of the sixteen colors, the foreground of graphic symbols, drawings or alpha-numeric characters are available only in the low intensity colors and only three at a time. This greatly reduces the variety and brilliance of color displays for such popular graphics as line graphs, bar and pie charts, signs or titles, and games.

Also, for visual presentations, advertising, and other purposes computer graphic displays are frequently converted to photographic slides for later projection onto a large screen. The ability to change the low intensity colors to the high intensity colors and quickly select any background color would ease preparation and enhance such presentations.

Thus it can be seen that there would be great value and utility in providing these computer users with a simple, rapid and readily understandable means of changing any color, including black and white, to any other of the sixteen colors available with their present computer equipment, and to do this independently of the software, with preferably just a few pushbutton strokes. To the applicant's knowledge prior to the present invention there has yet to be produced a simple, relatively inexpensive means for achieving this. Thus, there is a need for some form of manually controllable color converter unit which can be inserted directly into the cabling between the computer and the display device. Such a system should also preferably be applicable to multi-color computer-steered paper plotting display devices. The converter should also be capable of being incorporated in the color display device by the display device manufacturers.

SUMMARY OF THE INVENTION

Two forms of color converters are described for converting, by operation of color select switches, pattern-generating signals from a signal source to signals which produce a selected variety of colored trace commands to a multi-color display device, as well as background color command signals when the display device is a color cathode ray tube monitor. The less sophisticated form of the invention to be described is designed to operate only with two-level monochrome e.g. black and white display-producing signals. The more sophisticated form of the invention provides this color selection from both monochrome and multi-color input command signals. In both forms of the invention detecting means are provided for detecting and distinguishing between the various input command signals (in the case of the purely monochrome signal-responsive embodiment between only two signal conditions) to selectively actuate encoder or generating means. The encoder or generating means produce at the converter unit output one of many possible color commands to the display device. It is preferred in either embodiment that as many as sixteen colors, including black, grey, and white may be selected according to any one of at least sixteen possible manual switch settings. The system is thus conveniently suited to the current "RGB" (red-green-blue) color command protocol.

The output signals of these encoder or generating means govern the color of the "foreground" pattern, as well as the color of the background in a monochrome program when using a color cathode ray tube.

There are prior art converters of a nature completely different from the present invention, which converters respond to a continuum of different signal levels to produce different colors on a color cathode ray tube. They are not conveniently designed to enable a user to select one of a variety of colors for the background and another for the pattern trace.

Thus, U.S. Pat. No. 3,258,528 issued to Oppenheimer on June 28, 1966, discloses such a grey scale color converter using a plurality of gates and limited-excursion amplifiers to actuate the red, green, and blue guns of a color display in a fixed predetermined way as the amplitude of the monochrome input signal varies. Because of the arrangement of the logical circuitry shown therein, only one of the three primary colors will be displayed at maximum signal input, and only one other of the primary colors will be displayed at minimum signal input. This circuit provides for a primary color to be present under zero-signal conditions, and thus provides only one of the three primary colors as a background color in a monochrome transmission. Further, it is stated therein (column 2, lines 24-26) that by repositioning the gun cables one can change the variation in the color display with grey scale. Such a recabling or manual switching, however, is not a convenient manual switching system which enables the user readily to select one of a large number of different background colors and one of a large number of different trace colors for a given monochrome background or trace-producing input signal.

The more advanced and preferred version of the converter of the present invention provides a means for converting any one or all of the total plurality of sixteen source color commands (signal conditions) to any one of a chosen plurality of many, such as sixteen output color commands. According to a feature of the invention, manually operable switching means, such as sixteen pushbutton switches, are provided for selecting "candidate" source color commands for changing, as well as for selecting the associated color command to be sent to the display unit upon receipt of each individual input command.

According to a related feature of the invention indicator means, preferably in the form of sixteen lights, each corresponding to one of the possible input color commands used in the "RGB" system, selectively illuminate upon detecting the inputting of its associated color command. (These color command signals are fixed and repetitive whenever a stationary display is produced by the display-producing input command signals.) Each such lamp in this embodiment has closely affixed thereto a written legend indicating the particular color command to which it responds, (e.g. "bright blue"). In this embodiment each of these lamps and its individual color legend is identified in an outlined area on a control panel. Each outlined area has a pushbutton or other switch means therein so that if there are sixteen possible color selections there are sixteen such outlined (or otherwise designated) areas. Operating the switch associated with such an area with a lighted lamp for a given color identifies that incoming color as a selected "candidate" for conversion. Operating one of the other switches thereafter causes the "candidate" color to be changed to the color indicated by the color legend on the designated area involved. In the preferred embodiment, and according to a related specific feature of the invention, a pair of mode-indicating lights are selectively activated to indicate whether the system is in "candidate select" or "redesignate" mode.

According to related features of the invention the different possible output color commands are stored in binary form in an addressable memory means, and each input color command level present on each of four parallel input lines is communicated to one of the address terminals of the memory. Reset means are provided for pre-loading the contents of each of the sixteen address locations with the contents (in binary form) equal to the address itself. Thus, subsequent to a reset operation an incoming color command will access a given address by means of the address decoders within the random access memory chip (detecting means) to cause the contents of that address to be outputted to the color display unit. Since the numerical contents of the addressed location is equal to the numerical address itself, input color commands are relayed without change to the color display unit. The color redesignation process consists of changing the contents of any selected address (corresponding to a given input color command) and converting the contents stored therein to a value corresponding to the new output color command desired.

Although the above referenced detection and recoding of color commands could also be accomplished by other forms of gating logic, the resettable random access memory system described herein provides an inexpensive way of achieving the desired results using off-the-shelf commercially available components, without necessitating the employment of a custom recoding chip requiring heavy initial capitalization in the manufacture of such a unit. Other advantages and features of the invention will become apparent upon making reference to the specification, claims, and drawings to follow.

BRIEF DESCRIPTION OF DRAWINGS

FIG. 1 is a pictorial view of a preferred operating panel layout of the present invention showing indicator lights having associated indicia for selectively displaying and identifying all incoming color commands by color, and associated switches for selecting incoming color commands to be changed to transformed output color commands.

FIG. 2 shows how FIGS. 2A and 2B are to be connected to form one overall diagram;

FIGS. 2A and 2B are overall circuit schematic diagrams of the invention, but showing the light display unit controlling the light of FIG. 1, as well as a logic control unit, in block outline only.

FIG. 5 is a simplified block schematic diagram of the relevant operative elements of the converter in the normal (run) mode.

FIG. 6 is a block schematic diagram of the relevant operative elements of the converter used in the first phase of color command modification, namely selecting an input color command to be changed.

FIG. 7 is a block schematic diagram of the relevant operative elements used in the second phase of command modification, i.e., selecting the new output color command code.

FIG. 8 is a block schematic view of the relevant operative elements of the converter used during reset mode, wherein each individual output color command code is set to correspond identically to one of the various input color command codes.

FIG. 9 is a circuit schematic diagram of a simplified converter suited to convert purely monochrome display commands.

FIG. 10 (see sheet with FIG. 1) is a block schematic circuit showing the converter connected to convert color commands sent from a computer via cabling and to send converted commands from its output to a multi-color display unit via cabling.

DETAILED DESCRIPTION OF THE INVENTION

Figures 2, 2A:
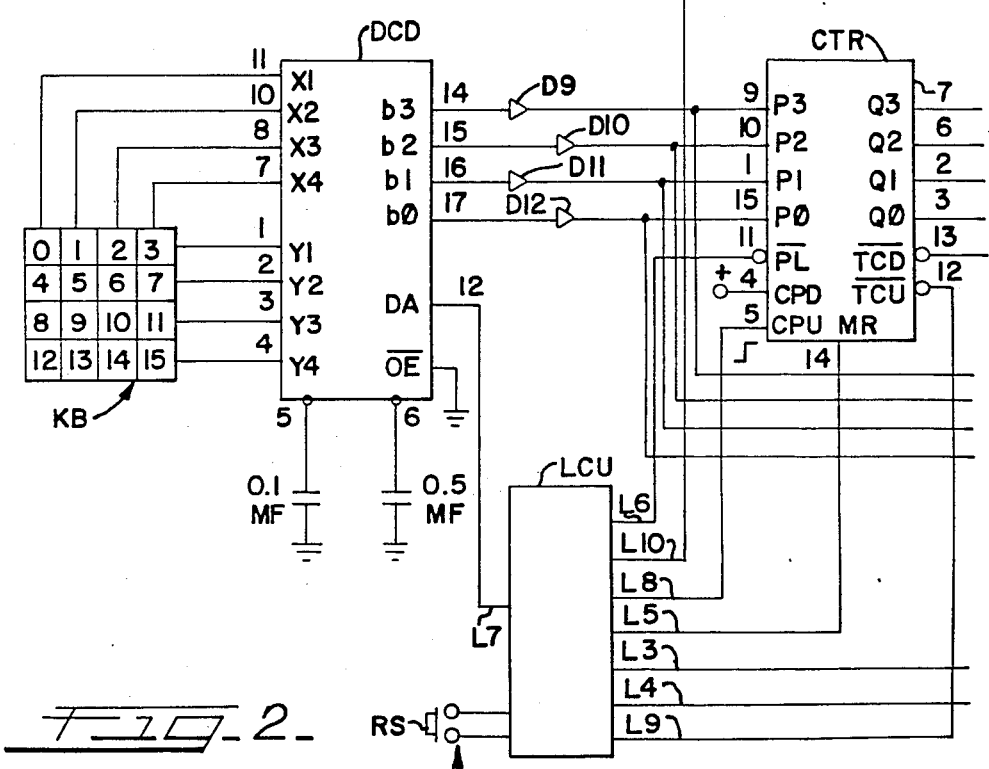

FIG. 1 shows a view of the front panel lay-out 10' of a stand-alone interface version of a color converter in a housing 10. An embodiment featuring such a panel occupying the forward face of such a low profile enclosure 10 can be placed atop a computer and will support a color monitor upon it. This arrangement provides maximum convenience for access to the controls without sacrificing additional desk space, and permits connection of the video signals with a minimum of added cable length that could degrade performance. FIG. 10 is a block diagram showing the converter 10 connected to convert color commands sent from a computer CP via cabling CL1 and to send converted commands from its output to a multi-color display unit DU via cabling CL2.

Before describing in detail how the circuit works, a brief description will be given of what the system does, and in what sequence. A bypass switch actuated by a pushbutton MS' places the device either in a "run" mode in which it is functional to effect color changes, or in a "bypass" mode which completely bypasses the device and displays the resident software-programmed colors commanded by the computer CP on the screen of the monitor (display unit) DU without change. Thus by switching back and forth the user can compare the original program colors with the new colors he has selected. A keyboard contains sixteen switch pushbuttons S0-S15 actuating corresponding switches in a keyboard matrix KB (FIG. 2), each pushbutton having immediately therebelow different indicia or color legend e.g. CL labeling one of the sixteen colors that the computer CP is capable of producing, as well as a "reset" switch pushbutton RS that restores the original program colors at any time while in the active (run) mode. Closely proximate to each of the pushbuttons S0-S15 are lamps L0-L15, each of which when illuminated automatically indicates that the associated color is being routinely commanded (called) by the software program resident in the computer CP, and is thus available for change. Also in the keyboard area are two indicator lamps ML1, ML2 which show the status of the converter for selection of either a programmed (input) color or a chosen new color to be sent out.

Upon switching on power, the "FROM" lamp ML1 will light and each lamp associated with an incoming program color will be automatically illuminated. Thus the user sees immediately which colors are contained in the original program, and are thus available for change. From these, a given "candidate" color to be changed is selected by pressing its associated lighted pushbutton, whereupon the "FROM" lamp ML1 goes out and the "TO" lamp ML2 is illuminated. The new different color is then selected by pressing any of the remaining pushbuttons S0-S15. When such a key is pressed, the thus identified original input color as seen on the monitor changes instantly to the new color selected, the "TO" lamp ML2 extinguishes and the "FROM" lamp ML1 lights, the system once again being ready to accept new color-changing commands; however the lamp associated with the original color remains on. In fact, all input color indicator lamps L0-L15 remain lit as long as power to the unit is on and their associated color codes are being sent to the converter. The lamp for the new color selected does not light. If the user wishes to go back to the original program colors and reselect new colors, he can do so by pressing the "RESET" pushbutton RS. As stated above, actuating the bypass switch pushbutton MS' will permit return to the original colors without disturbing the new colors selected. It will be noted that each switch S0–S15, its associated color legend e.g. CL, and lamp L0–L15 is bounded by marking lines, e.g. ML1, ML2, ML3 to denote designated areas for each such switch, legend, and lamp.

What the converter does having been described in broad detail, the relevant circuitry will next be discussed. FIG. 2 (split between two FIGS. 2A and 2B) shows the major details of the circuitry whereby the foregoing is accomplished. It will be noted that two elements LCU (logic control unit) and LD (light display unit) are shown in functional block outline only, the details of these circuits being shown in FIGS. 3 and 4 respectively. At any time, except during the above-mentioned steps when the user is entering color changes or commanding system reset, the general information flow of the system is best shown schematically in block functional form in FIG. 5. Thus is the "run" mode.

The system described herein is particularized for illustrative purposes to the widely accepted I.B.M. four-bit color control code used to command the red, green, and blue guns of a cathode ray tube color monitor. Three specifically chosen bits command these guns to an "on" or "off" condition respectively to provide selective control to these three guns. There is further provided a binary intensity bit exerting overall control of whatever guns are currently commanded from an active state to a half-intensity position. Thus, not only can the combinations blue, green, cyan, red, brown, white and black be produced, but also bright blue, bright green, bright cyan, bright red, bright yellow, bright white and dark grey be produced as well. Each of these "colors" can be selectively commanded by appropriate logical states at the input terminals TI3–TI6 of the lines labeled I, R, G, and B in FIGS. 2 and 5. Table I shows the particular coding scheme used in the present system.

TABLE I

| LINE STATUS | | | | |
|---|---|---|---|---|
| R | G | B | I | COLOR |
| 0 | 0 | 0 | 0 | Black |
| 0 | 0 | 1 | 0 | Blue |
| 0 | 1 | 0 | 0 | Green |
| 0 | 1 | 1 | 0 | Cyan |
| 1 | 0 | 0 | 0 | Red |
| 1 | 0 | 1 | 0 | Magenta |
| 1 | 1 | 0 | 0 | Brown |
| 1 | 1 | 1 | 0 | White |
| 0 | 0 | 0 | 1 | Gray |
| 0 | 0 | 1 | 1 | Bright Blue |
| 0 | 1 | 0 | 1 | Bright Green |
| 0 | 1 | 1 | 1 | Bright Cyan |
| 1 | 0 | 0 | 1 | Bright Red |
| 1 | 0 | 1 | 1 | Bright Magenta |
| 1 | 1 | 0 | 1 | Bright Yellow |
| 1 | 1 | 1 | 1 | Bright White |

Thus, with reference to FIG. 5, at any given instant, one of these unique color command codes will be present on the input terminals TI3–TI6 of lines I, R, G, and B. The command codes present at the input terminals TI3–TI6 thus appear at the input terminals of multiplexer MX1 (corresponding to terminals I1a–I1d; see FIG. 2), the multiplexer being controlled via an appropriate line signal on line L3 controlling its set terminal S to connect these input signals to the output of the multiplexer MX1, and from there to the address terminals A of a random access memory RAM. As each individual color command code appears at the address terminals A of the random access memory RAM, whatever color code is stored in the addressed location will be sent immediately from the output terminals 0 to output terminals TO3–TO6 of the system. The internal address decoders AD (FIG. 2B) of the RAM thus function as "detecting means" for controllingly selecting which RAM address will be chosen to output or "generate" its stored contents. As will be discussed subsequently, an initial loading operation occurs automatically during the reset operation which causes the code stored at each address in the random access memory RAM to be identical with its associated normal input color command, i.e. at the bright cyan address 0111 is stored the bright cyan code 0111. Thus, as initially loaded, the random access memory will cause all input color codes received by the multiplexer MX1 to be sent to the output terminals of the converter without alteration.

Further, as will subsequently be discussed, in the light display array consisting of lights L0–L15 on the control panel 10' certain lights will remain latched in the illuminated condition as long as their particular associated colors are being received at the input terminals TI3–TI6 of the converter.

FIG. 6 shows the first step in the color modification process, wherein the user pushes a pushbutton associated with a given illuminated light, e.g. blue (S1, L1), indicating that a blue color command is being routinely sent into the converter, the user desiring to change blue input color commands to, for example, bright cyan output commands. Referring to FIG. 6, depression of pushbutton S1 will cause the associated keyboard matrix KB to activate the appropriate input lines X and Y of a decoder DCD to output the blue code 0010 to the input terminals P0–P3 (see FIG. 2) of a counter CTR. Counter CTR is held in a transfer mode to replicate this code in the four element latch LCH at the output thereof. This is accomplished by a low state signal applied to the parallel load terminal PL of the counter CTR from the logic control unit LCU responsively to the first actuation of one of the pushbuttons L0–L15. During this initial selection process signal flow through the multiplexer MX1 and the random access memory RAM continues as before. Immediately upon initial color selection, the mode light ML1 (FIG. 1) adjacent the legend "FROM" extinguishes, and mode light ML2 adjacent the legend "TO" turns on.

The user then selects a chosen color to replace blue, in our present example bright cyan, by depressing pushbutton S11. The control circuitry LCU momentarily sets the circuit configuration to that shown in FIG. 7. The blue code 0010 is transferred across the multiplexer MX1 to set the address terminals A of the random access memory RAM to the blue address 0010, and the bright cyan code 0111 commanded by the keyboard KB is sent from the decoder DCD to the lower multiplexer MX2 to be relayed to the data terminals D of the random access memory RAM, thereby storing the bright cyan code at the blue address. Immediately thereafter, having stored this new color command at the blue address, the logic control unit LCU commands a reversion to the configuration shown in FIG. 5. Each subsequent appearance of a blue color command at the input terminals of the converter thus is converted to a bright cyan color code at the output. Also, mode light ML2 extinguishes and light ML1 illuminates. The system is now ready for additional color changes.

FIG. 8 shows the information flow during the reset operation. This reset operation is initiated automatically on power up, or alternatively by depression of the reset switch pushbutton RS communicating with the logic control unit LCU shown in functional form in FIG. 2. The logic control unit LCU then configures the counter CTR by appropriate commands to terminals CPU and PL to generate sequentially the binary equivalents of the numbers 0, 1, 2, 3 . . . 15. Each of these binary numbers is sent to the address terminals A of the random access memory RAM via multiplexer MX1, and simultaneously to the data terminals D thereof through the lower multiplexer MX2. This system thus configured stores at each of the 16 addresses of the random access memory RAM a numerical value equal to its address. The logic control unit LCU terminates this operation upon transfer of the sixteenth number to the random access memory RAM, and then reconfigures the system to normal run mode as shown in FIG. 5.

Turning now to actual circuit details, and considering first the details of the principal elements of this system as shown in FIG. 2, it will be noted that the horizontal and vertical synchronization signals are carried directly between input and output terminals TI1, TO1, TI2, TO2 respectively of the system on the lines labeled H and V. The color command input code lines I, R, G, B are fed through drivers D1-D4 to the upper input terminals I1a-I1d of multipler MX1, as well as to terminals A-D of the light display unit LD shown in detail in FIG. 4. It will further be noted that the horizontal and vertical synchronization signals are fed to terminals E and F respectively of the light display unit LD, and the horizontal signal is also fed to the logic control unit LCU via line L10. The output terminals Za-Zd of the multiplexer MX1 are connected respectively to the address terminals A0-A3 of the random access memory RAM, which is of the open-collector type requiring pull-up resistors RP1-RP4. These outputs are connected to corresponding poles of a 4-pole double throw mode switch MS which alternatively connects the output terminals TO3-TO6 either to the output of the random access memory RAM, or alternatively directly to the corresponding input terminals TI3-TI6. Thus, at any time the user may at his option display either an altered or unchanged color pattern by actuation of the mode switch pushbutton MS' (FIG. 1).

In run mode the logic control unit LCU, which is connected to the set terminal S of the multiplexer MX1 and to the write-enable terminal WE of the random access memory RAM via lines L3, holds these two terminals in a high state, thereby causing the multiplexer to interconnect its output terminals Za-Zd to its upper input terminals I1a-I1d, and also causing the random access memory RAM to be frozen in a read-only state. The information flow is thus as shown in FIG. 5.

Upon selecting a color to be changed by depressing one of the pushbuttons S0-S15 of the control panel 10 (FIG. 1), the corresponding switch element in the keyboard matrix KB is actuated. The keyboard switch matrix is connected by conventional means to terminals Y1-Y4 and X1-X4 of decoder DCD to produce at its output terminals b0-b3 a binary number equal to the number of the switch element. The "data available" pin DA of the decoder also goes high at this time and remains there as long as any one of the pushbuttons S0-S15 is held depressed. Line L7 conveys the state of the data available terminal DA of the decoder DCD to the logic control unit LCU, which responsively actuates the counter CTR to a data-transfer condition by pulling the parallel load terminal PL of the counter low via line L6. The master reset terminal MR of the counter CTR remains low in this phase and in all other phases of circuit operation, except immediately prior to generating the previously mentioned counting process during reset. Thus, the color command code appearing at terminals b0-b3 of the decoder DCD is transferred via drivers D9-D12 to input terminals P0-P3 of the counter CTR to appear in a latched state at the output terminals Q0-Q3 thereof. Line L3 remains in a high state during this operation, as a result of which the multiplexer MX1 and the random access memory RAM remain configured as they were in run mode.

Upon the next depression of one of the switches S0-S15 (FIG. 1) to choose the replacement color, the binary code representing the number of the chosen switch appears at the output terminals b0-b3 of the decoder DCD, and again the data available terminal DA goes momentarily high. The appearance of this second pulse on line 7 causes the logic control unit LCU to place lines L3 in a low state, thereby shifting the active input terminals of multiplexer MX1 to terminals I0a-I0d, and placing the random access memory in a data-accepting state by placing the write-enable terminal WE in a low state. Additionally, the logic control unit LCU actuates the multiplexer MX2 via line 4, placing the set terminal S of this multiplexer in a low state to connect the output terminals Za-Zd with its input terminal group I0a-I0d. These input terminals are connected to the outputs of the drivers D9-D12, and the output terminals are connected to the data terminals D0-D3 of the random access memory RAM. The circuit is thus configured as shown in FIG. 7 to place the substitute color command code at the address of the selected incoming command code, as previously described. Upon disappearance of the "data available" signal available on line L7 after release of the selected pushbutton, the logic control unit then resets lines L3 to a high state to reestablish run mode as shown in FIG. 5.

With respect to the "reset" operation it will be recalled that pushing the reset button RS of the logic control unit LCU reconfigures the system as shown in FIG. 8 to cause the binary equivalents of numbers 0-15 to be sequentially stored in the address of the random access memory RAM at addresses equal to their numerical values. Thus, responsively to closure of the reset switch RS (FIG. 2), the logic control unit LCU places a high state on line L6, thereby disabling the parallel load capability of the counter CTR. The state of the counter CTR present at output terminals Q0-Q3 is cleared to zero by the outputting by the logic control unit LCU on line L5 a momentary high state communicated to the master reset terminal MR of the counter CTR. The logic control unit LCU also transfers a replica of the horizontal synchronization pulse communicated from line H to the logic control unit LCU and thence to the clock pulse input terminal CPU of the counter CTR, this counter responding to a positive rising pulse edge to increment the output count displayed between terminals Q0-Q3.

Also, the logic control unit LCU places line L4, leading to the set terminal S of the lower multiplexer MX2 via line L4, to a high state to interconnect the upper input terminals I1a–I1d to the output terminals Za–Zd, thereby relaying the four output logical states of the counter CTR to the data terminals D0–D3 of the random access memory RAM. Line L3 is pulsed during this period synchronously with the horizontal synchronization pulses, being pulsed to a low state by each horizontal synchronization pulse to activate the random access memory RAM to a "read" condition, and simultaneously interconnecting the inputs I0a–I0d to the output terminals Za–Zd of multiplexer MX1. The circuit is thus configured as shown in FIG. 8 during the occurrence of each horizontal synchronization pulse, to load a generated number at its corresponding address. The counter CTR upon a terminal count of 15, i.e. the end of the reset operation, outputs a low state from the "terminal count up" terminal TCU to the logic control unit LCU via line L9, this pulse actuating the logic control unit to restore the system lines to run mode.

Figure 3:
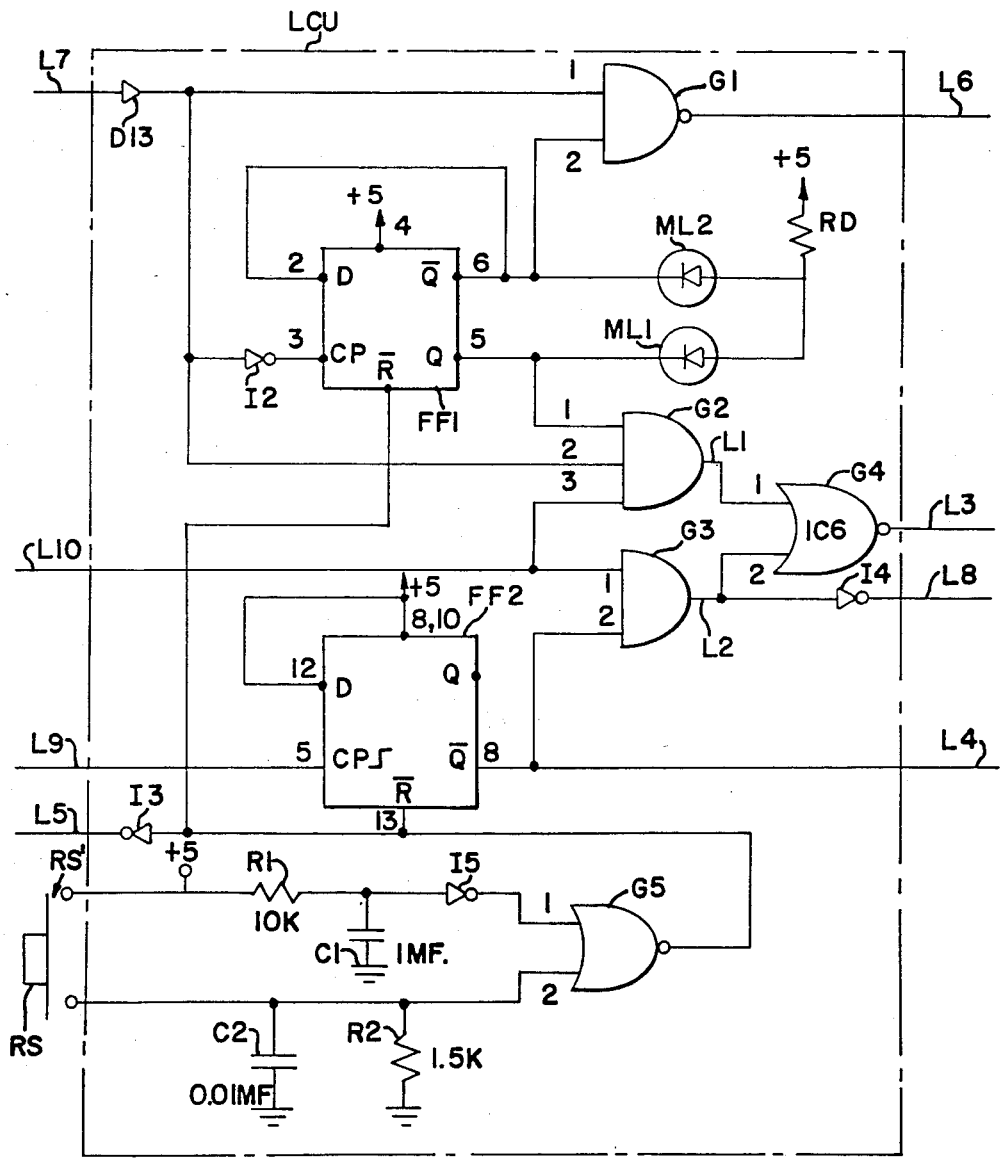
FIG. 3 is a circuit schematic diagram of the logic control unit of FIG. 2.
Figure 4:
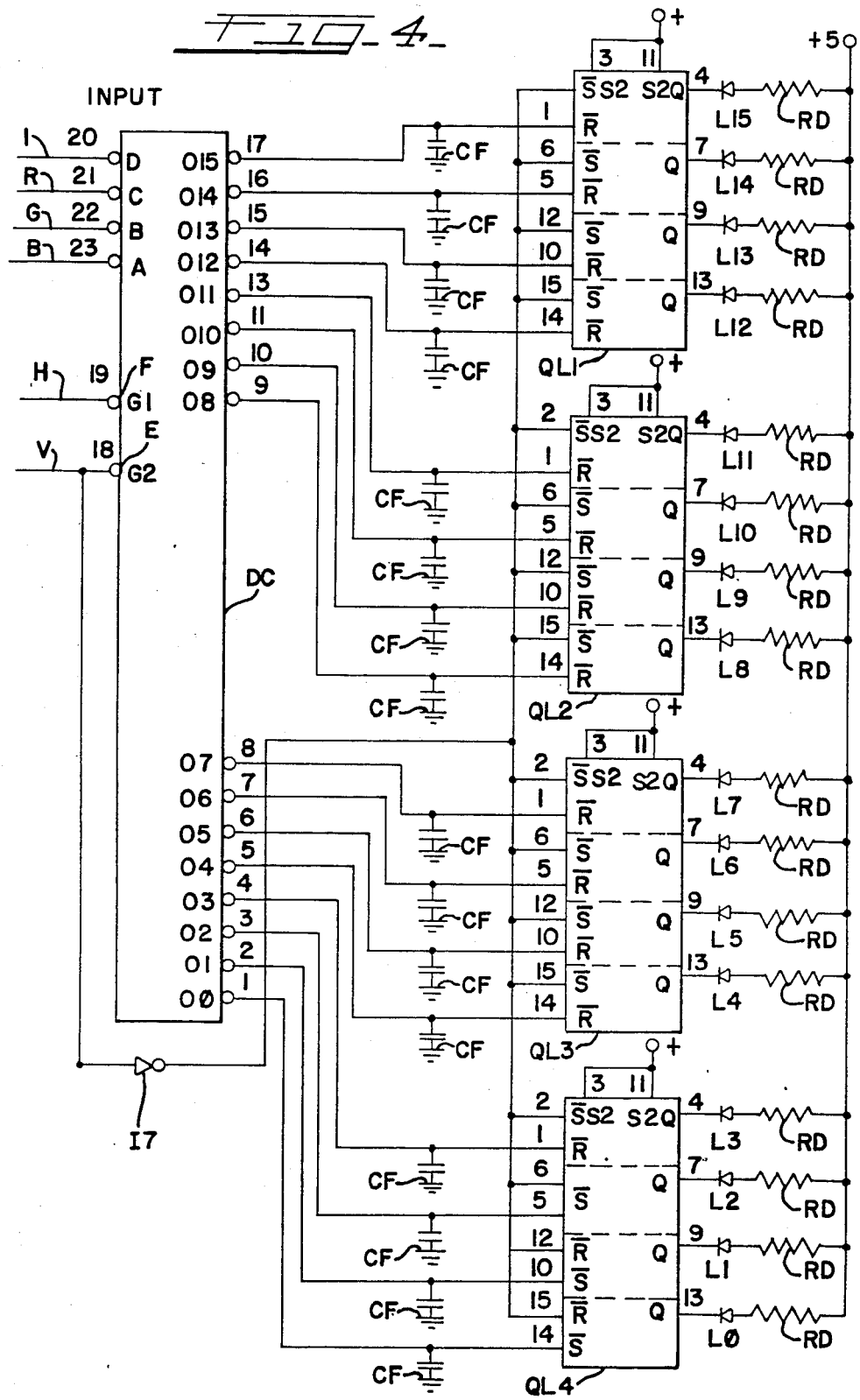
FIG. 4 is a circuit schematic diagram of the light display unit of FIG. 2.

Considering next the details of the logic control unit as shown in FIG. 3, the reset operation is initiated either on first applying power to the unit, or alternatively thereafter by depressing the reset pushbutton RS to close the terminals of switch RS'. As will shortly be discussed, either mode of actuation causes the output of NOR-gate G5 to be actuated momentarily low from its quiescent high state. This signal is applied to the reset terminals R of two edge-triggered D flip-flops FF1 and FF2, the output states of these two units then governing associated control logic to initiate the reset operation. This same reset pulse is also inverted via inverter I3 to send a corresponding temporary high state out on line L5 to master reset terminal MR of counter CTR (FIG. 2).

Deferring for the moment details of the various logical states produced during the reset operation, the reset pulse is generated on a power-up condition by means of a resistor R1 connected to the positive supply rails and feeding terminal 1 of NOR gate G5 via an inverter I5. The juncture between resistor R1 and inverter I5 is grounded through a capacitor C1. Terminal 2 of gate G5 is grounded through the parallel combination of resistor R2 and capacitor C2. When power is applied to the system, inverter I5 rises to an active state as quickly as the positive system rail, drawing its power, as do all other elements of the circuit, from this source. Similarly, gate G5 is also active shortly after turning on the system power. Terminal 2 of gate G5 is at ground potential. Immediately after power-up, capacitor C1 effectively holds the input to inverter I5 in a low state for a brief period of time, as a result of which input terminal 1 of gate G5 is temporarily high, resulting in a low state at the output of this gate to initiate the reset of the flip-flops FF1 and FF2. A brief period of time thereafter, capacitor C1 charges up, removing this condition at terminal 1 of gate G5, whereupon the reset pulse is removed from the flip-flops FF1 and FF2, as is the corresponding temporary high state produced on line L5. Alternatively, at any time after capacitor C1 has charged to its final state, actuation of the reset button RS to close switch RS' connects terminal 2 of gate G5 to the positive system voltage to produce a similar temporary low state of the output of gate G5. Release of the reset switch allows the high state at terminal 2 of gate G5 to bleed down to a low state as set by the time constant established by capacitor C2 and resistor R2.

As previously discussed, the immediate result of the reset low pulse from the output of gate G5 is to clear the flip-flops FF1 and FF2. Flip-flop FF1 has its not-Q terminal strapped to the data terminal D, thus functioning as a conventional scale-of-two circuit, requiring two positive edge input pulses to the clock terminal CP to restore the original reset condition. As will shortly be discussed, such pulses are derived from the data available terminal DA of the decoder DCD upon actuation of one of the pushbuttons S0–S15, and are coupled to the logic control unit LCU via line L7 and through driver D13 and inverter I2.

The initial reset condition places the output terminal Q in a low state and the not-Q terminal in a high state. Thus, as an immediate result of generating the reset pulse, load light ML, drawing power from the system positive bus via resistor RD and connected to the Q output terminal of flip-flop FF1, is illuminated. The indicator mode light ML2, similarly powered through resistor RD and connected through the not-Q terminal of flip-flop FF1, is extinguished. With reference to FIG. 1, it will be seen that the load light ML1 is illuminated opposite the legend "FROM", indicating that an input "candidate" color may now be selected for conversion. Also, since the not-Q terminal of flip-flop FF1 is in a high state, input terminal of NAND gate G1, having its input terminal 2 connected thereto, is enabled, and will output a low state to line L6 responsively to a high state in input line L7.

Flip-flop FF2 has its data pin D held permanently in a high state, as a result of which the reset pulse puts the not-Q terminal high and enables NAND gate G3 via direct connection to terminal 2 thereof. Flip-flop FF2 is thus configured after reset to latchingly transfer the first positive edge trigger pulse applied to the clock terminal CP via line L9 to place the not-Q terminal thereof in a latched low state, to remain there until the next reset operation. As will shortly be discussed, the purpose of this latch is to terminate a reset loading count operation wherein the binary equivalents of the numbers 0 through 15 inclusive are sequentially generated at the output of the counter CTR to be loaded at corresponding addresses in the RAM.

It will also be recalled that the reset pulse creates a temporary high state on line L5 connected to the master reset terminal MR of the counter CTR, thereby clearing the output buffer contents to place output terminals Q0–Q3 in a low state, i.e. binary 0000. Upon disappearance of the reset pulse, this condition is relieved, and the counter CTR is then placed in a counting state, which will be discussed next.

After the disappearance of the counter reset pulse on line L5, it will be noted that line L7, receiving the data available signal from the keyboard decoder DCD remains low, no keyboard entry having been made as yet, with the result that terminal 1 of NAND gate G1 is low, resulting in a high state on output line L6 connected to the parallel load terminal PL of the counter CTR. The counter CTR is thus configured to accept positive edge clock pulses at the clock terminal CPU thereof via line L8. Similarly, as has been discussed, the latch FF2 upon reset has its not-Q terminal high, resulting in a high state on line L4, which in turn configures the multiplexer MX2 to transfer data from the output terminals Q0–Q3 of the counter CTR to the data terminals D0–D3 of the random access memory RAM. Also, as has been discussed, gate G3 in this configuration is enabled, with the result that horizontal input pulses from line H via line L10 are transferred to the output of NAND gate G3 to appear in inverted form on line L8 through the inverter I4. A series of temporary low states on line L8 are thus generated responsively to the input of each positive horizontal synchronizing pulse on line L10.

The three input NAND gate G2 has terminal 1 thereof connected to the Q terminal of flip-flop FF1, and terminal 2 connected to the data available signal at the output of driver D13, terminal 3 to the horizontal synchronization pulses on line L10. Since there are no data available pulses at this time, gate G2 is disabled, producing a low state on line L1 coupling its output to terminal 1 of NOR gate G4. Terminal 2 of gate G4 is connected to output line L2 from gate G3. Since line L2 passes the horizontal synchronization pulses during this phase as received from line L10, output line L3, connected to the output of gate G4, is similarly pulled down to a temporary low state in synchronism with the inverted synchronization pulses on line L8. The leading edge of each such pull-down on line L3 enables the random access memory RAM at terminal WE, and also configures multiplexer MX1 at termnal S thereof to relay the contents of the counter output at terminals Q0-Q3 to the address terminals A0-A3 of the RAM. Thus, the number stored, in this case 0000, is used to set the address of the RAM and also to replicate the same number to be stored at this address, as previously described.

Upon disappearance of the horizontal synchronization pulse, the pull-down on lines L3 and L8 is removed, the resulting rising edge on line L8 serving to increment the count at the output of the counter CTR. This sequence continues until a terminal count of 15 has been generated to appear at, and be transferred into, the memory RAM from the counter CTR. At the end of the fifteenth horizontal synchronization pulse, the terminal-count-up terminal TCU of the counter CTR sends out a temporary low state on line L9 placing a latched low state at the not-Q terminal of flip-flop FF2, latching line L4 to a permanent low condition (until the next reset), thereby configuring multiplexer MX2 to receive all subsequent inputs directly from the output of the decoder DCD. Also, this same latching of flip-flop FF2 disables gate G3 and prevents further transfer of horizontal synchronization pulses to line L8, which now stays permanently in a high state until reset, resulting in no further clock pulses to the counter CTR.

It will also be recalled that gate G2 was disabled by the reset operation, as a result of which line L3 is now in a high state, freezing the contents of the random access memory RAM, and configuring multiplexer MX1 to transfer data to the address terminals of the RAM from the input lines I, R, G, and B. The system is now in "run" mode, the RAM having been appropriately loaded, and the multiplexer MX1 now being appropriately set.

With the system thus finally in "run" mode and processing input color commands, certain of the lights L0-L15 will be lighted, each such lamp indicating the repeated inputting of one of the possible input color commands. Next, to enter the color changing mode, pushing a chosen pushbutton adjacent a lighted lamp selects that input color as a candidate for changing. As previously discussed, this causes the data available pin DA of the keyboard decoder BCD to undergo a low-high transition, and to remain high until the pushbutton is released. Thus, upon initial depression of the pushbutton line L7 is driven high. It will be recalled that gate G1 was enabled by the reset operation. The initial rise on line L7 has no effect on the upper flip-flop FF1, owing to the presence of inverter I2 in series with the clock input terminal CP thereof.

Since both input terminals of G1 are now high, output line L6 is driven low, thereby configuring the counter CTR to a parallel load configuration from the low signal now applied to terminal PL thereof. Thus, the binary number corresponding to the depressed pushbutton appears at the output of terminals b0-b3 of the keyboard decoder DCD, and this "FROM" (candidate) color code is stored in the output stages Q0-Q3 of the counter CTR.

Upon release of pressure to the chosen pushbutton, line L7 against reverts to a low state, correspondingly driving line L6 high to leave the stored output code in the counter CTR in a latched state. Since this causes a high-low transition on line L7, a positive edge clock pulse is thus entered into the clock terminal CP of flip-flip FF1, causing a reversion of the state thereof, which extinguishes mode light ML1, turns on mode light ML2 next to the legend "TO" (FIG. 1), and also disables gate G1. Line L3 undergoes no change at this time, since gates G2 and C3 are disabled. The system is thus configured via line L3 to remain in "run" mode, and no interruption thereof occurs during the selection of the color to be changed.

The replacement color is selected by pushing one of the pushbuttons S0-S15, again placing a high state on line L7. Gate G1 is still disabled, therefore there is no actuation of the counter CTR to a parallel load condition via line L6. It will also be recalled that the candidate for conversion previously selected is still in the output latch of the counter CTR. Again, because of the presence of the inverter I2, the flip-flop FF1 does not undergo a change of state immediately upon the second button depression. As a result of this, terminal 1 of NAND gate G2 is high, terminal 2 is similarly held high as long as the pushbutton is held down, and horizontal synchronization pulses coming in from line L10 are outputted to the output of gate G2 on line L1. Also, it will be recalled that flip-flop FF2 has been triggered to a low condition at the not-Q terminal thereof by the terminal count-of-fifteen pulse received at the end of the reset operation via line L9, with the result that gate G3 is disabled. As a result, inverted horizontal synchronization pulses are placed on line L3, and line L8 remains in a high state, i.e. incapable of feeding pulses to the clock terminal CPU of the counter CTR.

Concomitant to the first pull-down on line L3, corresponding to receipt of the first horizontal synchronization pulse after the second button push operation, and recalling that multiplexer MX2 has been locked to relay the output of decoder DCD to the data terminals D0-D3 of the memory RAM, it will be seen that on the initial drop of line L3 to a low state, the contents of the candidate address stored in the latch goes to address terminals A0-A4 of the memory RAM. Shortly thereafter, and during the duration of the horizontal synchronization pulse, the new color code is transferred via multiplexer MX2 to the data terminals D0-D3 of the memory RAM. Upon removal of the horizontal synchronization pulse, line L3 removes the write-enable (low) condition at terminal WE of the memory RAM, resulting in completion of loading of the altered color code at the address of the candidate color, i.e. the color initially chosen to be changed by the first button pushed. Upon release of the pressure to the pushbutton S0-S15, the inverted signal applied to terminal CP of flip-flop FF1 causes FF1 again to change state, reconfiguring the lights ML1, ML2 to their original configuration in which a candidate is to be selected, i.e. ML1 is illuminated opposite "FROM", and the system is reconfigured to "run" mode as before.

Considering next the details of the light display circuit LD, it will be seen that each of the indicator lights L0–L15 takes the form of a light-emitting diode having its cathode connected through a current limiting resistor RD to the positive system voltage of 5 volts and having its anode connected to the output terminal Q of a latch. In the preferred embodiment shown, a total of four quad latches (latching means) QL1–QL4 are used to provide the requisite 16 output terminals. All "set" terminals S are connected together. They are driven from the vertical synchronization line V via terminal E through an inverter I1. Since the vertical synchronization pulses are positive-going pulses of short duration, concommitant with each occurrence of a vertical synchronization pulse all set terminals are pulled low, thereby placing all output terminals Q of the four quad latches QL1–QL4 in a high state and extinguishing all of the indicator lamps L0–L15. Thus, irrespective of their prior history, all of the indicator lamps L0–L15 are momentarily extinguished 30 times each second.

The four color code lines I, R, G, and B are connected to input terminals D, C, B, A respectively of a four-to-sixteen decoder DC having output terminals O0–O15, each output terminal being connected sequentially to the sixteen reset terminals R of the four quad latches QL1–QL4. Thus, at any instant between vertical synchronization pulses, any color command code present at the input terminals A–D of decoder DC will cause a selected one of the output terminals O0–O15 to reset its associated latch, thereby placing its associated output terminal Q in a low state and turning on its associated light-emitting diode. Any such diodes so actuated will remain actuated until the appearance of the next vertical synchronization pulse again resets all latches to a high output state. To avoid possible spurious latching attendant to the transitions from one incoming color code to the next, sixteen small filter capacitors CF of nominal value of 100 picofarad capacity are connected between each latch reset terminal R and ground.

It is further desirable that the decoder DC be set to output a high state at its output terminals O0–O15 during each horizontal synchronization pulse. Since in the particular latches QL1–QL4 chosen the reset operation requires a negative edge trigger, placing all of the aforementioned output terminals high prevents resetting of the latches throughout the duration of positive horizontal synchronization pulses. The aforementioned condition is achieved by connecting the horizontal synchronization pulse line H to control terminal G1 of decoder DC via terminal F, and by communicating the vertical synchronization signal to control terminal G2 thereof. In the particular decoder chosen, the decoder is in an active state when both terminals G1 and G2 are low, and all outputs are locked in a high state when either terminal G1 or terminal G2 is high. Thus all output terminals O0–O15 of decoder DC are held in a high state throughout the duration of either the vertical or the horizontal synchronization pulses. At all other times, however, the appearance of any given color command code at the decoder input will cause its associated indicator light to be latched in an emitting condition. It will be noted, however, that no matter how brief the appearance of any color command, its associated light will remain lit until the next vertical synchronization pulse. Without such a latching feature, the appearance of very short-term color commands would not be visible to the eye.

It will also be noted that pin designations have been appended to the principal integrated circuits described thus far. These are with particular reference to the following commercially available integrated circuits: 74C922 (decoder DCD); 74LS74 (flip-flop FF1, FF2); 74LS193 (counter CTR); 74LS157 (multiplexer MX1); 74LS158 (multiplexer MX2); 74LS189 (memory element RAM); 74LS154 (decoder DC); 74LS279 (quad latches QL1–QL4).

The foregoing discussion has dealt with means for automatically changing chosen input color commands to different chosen output color commands. As mentioned in the Background of the Invention, a substantial body of existing software programs exists which can be processed by computers having color command capability and driving monitors having color display capability, but wherein the programs are inherently "monochromatic" so as to produce only black and white displays on a color monitor. Such a program on such a system will produce at the computer output terminals a simultaneous high ("on") condition on the red, green, and blue lines, or alternatively a simultaneous low ("off") condition on these same three lines to command the display to be typically either low or high intensity white or alternatively black, thereby producing, for example, white letters on a black background, or the converse thereof. FIG. 9 shows an alternative and simplified color converter circuit for producing a first chosen output color responsively to a white signal command at the input, and for producing a chosen different color responsively to a black signal command.

In the particular embodiment shown in FIG. 9, to avoid possible ambiguity produced by signals on the intensity line (if any), only the red, green, and blue command lines lead respectively from input terminals TI1, TI2, TI3 to input terminals 1, 2, 3 of a three input NOR gate G2. A high condition at any of the three inputs will produce a low output state. The output state of gate G2 is connected to input terminal 1 of a similar three-input NOR gate G2 having the remaining two input terminals 2, 3 tied to ground so as to function as an inverter. Thus, when any of the input terminals TI1–TI3 is high, gate G2 produces a high state and gate G1 produces a low state. A simultaneous low configuration at these inputs reverses these two ouput states. Each gate drives an associated hexadecimal switch BCD1, BCD2 at the input terminal IN thereof. Such switches are commercially available in a variety of forms, those shown in FIG. 9 being of the multi-position slider type having a manually operable member S1, S2 selectively settable to any one of sixteen possible locations. Setting either slider S1, S2 at any one location causes a unique group of its corresponding output terminals 8, 4, 2, 1 (the "eights line", the "fours line", etc.) to be connected to the input terminal IN. The switches BCD1, BCD2 are shown as contained within a housing H, to which suitable color-representing indicia e.g. I1, I2, I16 may be appended. The "eights" outputs 8 of each hexadecimal switch BCD1, BCD2 is connected to the cathode of an associated germanium isolation diode D1, D5, the cathodes being connected together and fed from the positive system bus through a resistor R, this same juncture being led to output terminal TO1 to serve as the intensity control. Similarly the "fours" outputs 4 of the two converter are similarly connected to diodes D2, D6 and a similar resistor R to the system positive rail, the diode-resistor junction being connected to output terminal TO2 to provide the red control signal. The "twos" and "ones" lines are similarly connected to feed the green and blue signals to output terminals TO3 and TO4 respectively.

In operation, having set slider S1 to a given position connecting, for example, terminals 8 and 4 of switch BCD1 to the input terminal IN thereof, and having set slider S2 to another position connecting, say, terminals 4 and 1 of switch BCD2 to its input terminal, it will be observed that, because of the isolating action of the diodes D1–D8 only the switch receiving a low input state will affect the condition of the output terminals TO1–TO4, by pulling certain lines low. Thus, when switch BCD1 receives a low input signal terminals TO1 and TO3 will be pulled down, irrespective of the setting of switch BCD2. Since switches BCD1 and BCD2 are driven out of phase with respect to each other, either switch BCD1 or switch BCD2 will alternatively govern the signal states on output terminals TO1–TO4 according to whether any one of the input terminals TI1–TI3 is high, or all are low, respectively. To insure positive actuation of TTL logic connected to the output terminals TO1–TO4, i.e. as presumed to be present in the driven display device or monitor, in the preferred embodiment the diodes D1–D8 are germanium diodes. This provides adequate line pull-down to insure transistor turn-off.

It is clear that a great variety of alternative gating schemes may be used to accomplish the selective actuation of the two hexadecimal switches BCD1, BCD2 according to the user's needs.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention, in appropriate instances even the specific claims involved should be construed in light of the doctrine of equivalents.

Further, in the claims to follow, the term "color" is, where appropriate, to be broadly construed to cover not only primary colors, but also intermediate colors provided by the relative mixing or omission threof, as well as white and grey and the absence of replicated color, e.g. black on a cathode ray tube or interruption of trace on, for example, a paper printer.

Similarly, both versions of converters shown herein are configured for parallel-line inputs and outputs; whereas, it will be recognized by those knowledgeable in the art that alternatively single-line serial input pattern commands could equally well be accepted at the input and provided at the output, provided that suitable conversion circuitry is included to convert respectively to and from the necessary input and output configurations shown herein. Also, the teachings of the present invention are applicable to a variety of other forms of color display units, such as, for example, multicolor paper printers or plotters steered by programmable computers. Moreover, for explanatory purposes, certain details of the logic control unit LCU of FIG. 3, have been simplified. It will be readily appreciated by those of ordinary skill in the art that an additional modest cost economy may be secured by configuring all of the gates G1, G2, and G3 as three-input AND gates with unused input terminals appropriately strapped in the case of gates G1 and G3, and by the further addition of an inverter at the output of gate G1.

Finally, the teachings of the present invention are not restricted to the particular form shown herein for selecting a given candidate color command for conversion, namely manually actuating an appropriately labeled switch. Alternatively, a light pen may readily be adapted by means evident to those of ordinary skill in the art so that the operator may simply touch the pen to an area on the cathode ray tube displaying a color he desires to change. Elementary gating and latching logic may be used to capture the particular color command being sent to the cathode ray tube as the beam sweeps across in front of the light pen, the captured color command being thus identified to the converter logic as the chosen candidate.

Moreover, the teachings of the present invention may readily be applied to graphic art systems using, for example, an eight line protocol giving rise to a "spectrum" of 256 possible colors, each one evoked by a different eight-bit command word. It is evident that the concept of using a limited number of labeled switches and associated indicator lights for identifying and selecting candidate color commands may readily be extended to include the use of an associated numerical readout device for presenting to the operator a decimal number corresponding to the color command selected by placement of the light pen. In such a system the operator would most conveniently choose the new color command to which the candidate color command is to be converted simply by entering the new color command in numerical form.

Thus, for example, if the operator wishes to cause a color change in a given area, by placing the light pen on that area he perceives on the numerical readout display a number, for example, 147. The number corresponding to the new color to be generated could most conveniently be selected by the user by a simple serial keyboard entry of the number corresponding to this new color, e.g. 150, with the result that the number 150 is stored in memory location 147 to provide the desired change. Additionally, irrespective of the means used to select which ones of the 256 possible color commands are being used in the generation of a given display, the code number corresponding to a given candidate color may similarly be serially entered by the operator.

The means for implementing the foregoing variants on the specific embodiments described herein are well known in the art, and would be evident to those of ordinary skill in the art, given the novel teachings of this disclosure.

We claim:

1. A color converter apparatus adapted to be interposed between the output of a signal source providing pattern-generating signals and a display device capable of producing visible multi-color display patterns in the form of picture element segments colored responsively to color control commands supplied sequentially thereto, the signal source providing for a finite plurality of source color control commands to be used in generating individual picture element segments of said pattern by said display device, said apparatus comprising:

input terminal means adapted to receive said source color control commands from said signal source;

output terminal means adapted to provide color commands to said display device;

detecting means coupled to said input terminal means for distinguishingly detecting among a plurality of different input color control commands as they sequentially appear at said input terminal means;

selecting means including manual switching means for selecting from a finite number of generatable color control commands at least a first second output color control command different from each other and different from said detected input color commands, each to be respectively generated responsively to the detected presence of a different one of said detected input color control commands;

means including generating means responsive to said detecting means and said selecting means for respectively generating said output color control commands responsively to the detected presence of said detected input color control commands and for coupling said output color control commands to said output terminal means; and indicator means for visually identifying which of said finite plurality of input color control commands have been detected by said detecting means, said indicator means including a plurality of visible display elements including means responsively coupled to said detecting means for selectively actuating each said display element responsively to the detection of a different one of said detectable input color control commands.

2. The color converter apparatus of claim 1 in combination with a signal source capable of producing only monochrome color commands.

3. The color converter apparatus of claim 1 wherein said switching means includes a plurality of individual manually actuated switching elements equal in number to the number of detectable input color control commands, each said switching element being operatively associated with a different one thereof, each of said switching elements when initially actuated including means for selecting its associated color control command as a candidate for conversion, and responsive to a subsequent actuation of any one of said elements for controllingly selecting its associated color control command to be generated thereafter responsively to each detection of said input color control command selected for conversion.

4. The color converter apparatus of claim 1 including latching switching means for holding each said display element in an actuated condition for a given period of time after the actuation thereof and subsequent to the disappearance of the input color command which actuated it.

5. The color converter apparatus of claims 1 or 4 adapted to respond to color control commands supplied to said input terminal means in the form of binary signal conditions on a plurality of parallel lines, each of said commands being represented by a unique binary number or code corresponding thereto, said detecting means including decoder means responsive to said signal conditions at said input terminal means and coupled to selectively actuate each said visible display element responsively to the receipt of its associated binary code.

6. The color converter apparatus of claim 1 wherein the number of said display elements is equal to the number of detectable signal source conditions.

7. The color converter apparatus of claim 6 further including panel means for mounting said display elements and switching elements on individually designated separate areas thereon, each said display element and the switching element operatively associated with the same input color command being disposed closely proximate to each other in a separate one of said designated areas.

8. The color converter apparatus of claim 7 wherein each said designated area is provided with a legend indicating the color corresponding to the detectable color command associated with its display element.

9. The color converter apparatus of claim 1 adapted to respond to color control commands supplied to said input terminal means in the form of binary signal conditions on a plurality of parallel lines, each of said color commands being represented by a unique binary number or code corresponding thereto.

10. The color converter apparatus of claim 9 wherein said generating means includes digital memory means having at least two addressable locations in which said generatable color command color are to be stored, said generating means outputting the contents of a given address to said output terminal means responsively to detection of an input color command code corresponding to said address.

11. The color converter apparatus of claim 10 wherein said detecting means is adapted to respond to all possible binary codes on said input terminal means, and said selecting and switching means and said generating means are operable to generate for each detected code a chosen different code.

12. The color converter apparatus of claim 10 further including means for storing a chosen generatable command code selected by said switching means at an address selected by said switching means and corresponding to one of said detected color command codes.

13. The color converter apparatus of claim 12 wherein said switching means includes a plurality of individual manually actuated switching elements equal in number to the number of detectable input color commands, each said element being operatively associated with a different one thereof, each of said switching elements when initially actuated including means for selecting a uniquely associated color control command as a candidate for conversion, and responsive to a subsequent actuation of any one of said elements for controllingly selecting its associated color control command to be generated thereafter responsively to each detection of said input color control command selected for conversion.

14. The color converter apparatus of claim 13 including means for automatically restoring said switching means after said subsequent switch element actuation to allow selection of another color command as a candidate for conversion.

15. The color converter apparatus of claim 13 where said detecting means includes address decoder means associated with said memory means for responding to receipt of each one of the detected color command codes to selectively access a location thereof having an address equal to the numerical value of said detected color command code, said switching means includes an encoder responsive to operation of each of said switching elements to place a unique binary code operatively associated therewith on parallel output terminals of said encoder, and multiplexer means coupled to said memory means and said encoder responsively to actuation of said switching elements so as to access the address corresponding to the binary code generated responsively to initial actuation of one of said switching elements and to load at said address the code generated by a second actuation of one of said switching elements, said apparatus including means for reverting said multiplexer means after said second actuation to communicate said input color command codes to said address decoder means.

16. The color converter apparatus of claim 13 further including visible mode display means automatically actuated by said selecting means to two different display conditions for indicating whether said selecting means is in a candidate selecting or generatable command selecting condition.

17. The color converter apparatus of claim 10 including means for storing each of said generatable command codes at an address location equal to the numerical value of the detectable color command code corresponding thereto, and reset means for loading at each said address an output color command code equal to said address so that generated codes are identical with detected codes.

18. The color converter apparatus of claim 10 wherein said detecting means includes address decoder means associated with said memory means and responsive to detection of each said detectable color command code to selectively access for generation therefrom a location thereof having an address equal to said detectable color command code.

19. The color converter apparatus of claim 1 further including bypass switch means for optionally communicating said input color commands unaltered to said output terminal means.

20. The color converter apparatus of claims 1, 9, 12, or 13 in combination with said signal source.

21. The color converter apparatus of claims 1, 9, 12, or 13 in combination with said signal source and said display unit and coupled therebetween.

22. The color converter apparatus of claims 1, 9, 12, or 13 in combination with said display unit.

23. A color converter apparatus adapted to be interposed between the output of a color display generator and the input of a raster-scanned color display device having means for receiving a finite number of different picture element color command codes in the form of binary states supplied simultaneously to a plurality of input terminals said display device to govern the color of each of the picture elements serially generated, said apparatus comprising:

a plurality of input terminal means for receiving parallel binary information and adapted to receive from said generator a finite number of different picture element color command codes in the form of binary states supplied simultaneously to said input terminal means;

output terminal means adapted to provide output color command codes to said display device;

decoding means for providing a different unique signal condition responsively to each of the different input color command codes upon the appearance thereof at said input terminal means;

manually operable switching means for selecting any of said input color commands for conversion to a different output color command and for selecting said different output color command;

control means responsive to said decoding means and said switching means for supplying to said output terminal means said different output color commands responsively to receipt of each input color command corresponding thereto; and display means responsive to said unique signal conditions for visually indicating the receipt of said input color command codes and for identifying each color corresponding thereto.

24. The color converter apparatus of claim 23 wherein said display means includes a plurality of lamp elements, control means responsive to said decoding means for energizing each one of said lamp elements responsively to receipt by said decoding means of a different one of said input color command codes, and latching switching means for maintaining each said lamp element in an energized state for a chosen length of time after the disappearance of the input color command code which actuated it.

25. The color converter aparatus of claims 23 or 24 in combination with said display device.

26. The color converter apparatus of claim 25 in combination with said display generator.

27. The color converter apparatus of claims 23 or 24 in combination with said display generator.

* * * * *